Jan. 19, 1965  F. A. SHOMAKER  3,166,242
OVEN TIMER

Filed Sept. 29, 1958  3 Sheets-Sheet 1

INVENTOR
FRANK A. SHOMAKER

BY Fisher, Christen, Sabol & Caldwell
ATTORNEYS

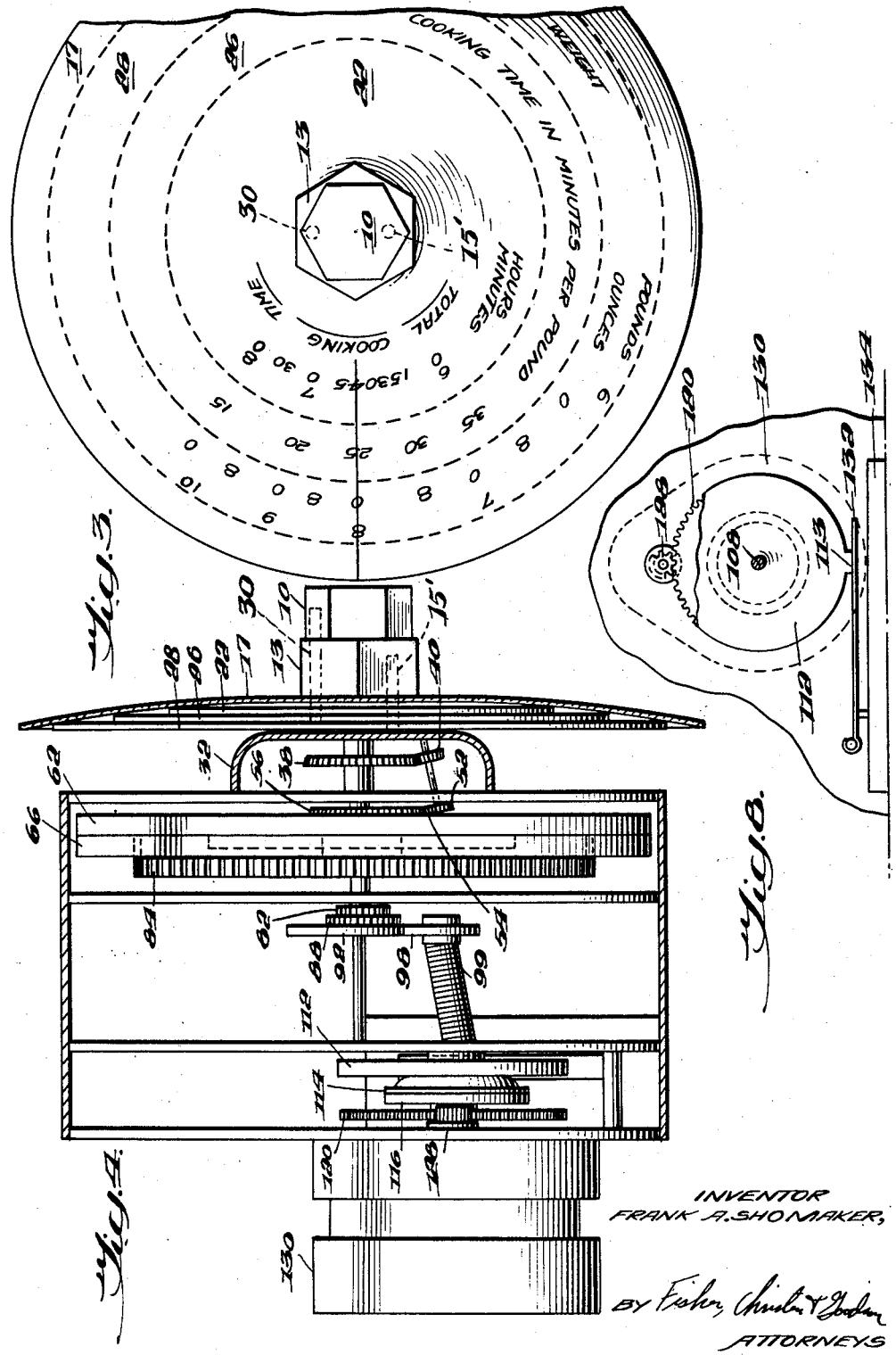

Jan. 19, 1965  F. A. SHOMAKER  3,166,242
OVEN TIMER
Filed Sept. 29, 1958  3 Sheets-Sheet 3
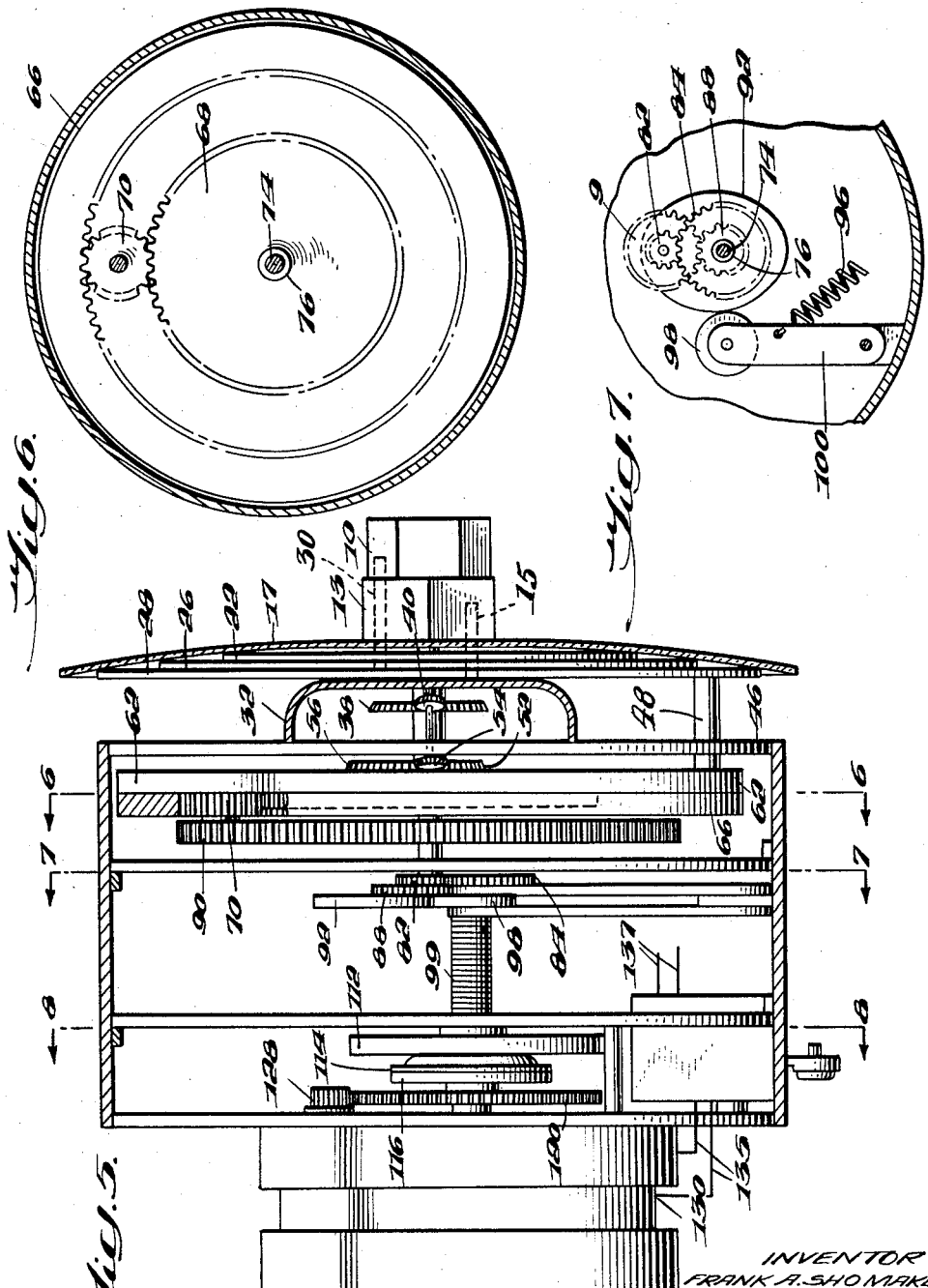
INVENTOR
FRANK A. SHOMAKER,
BY Fisher Christen & Goodson
ATTORNEYS

United States Patent Office 3,166,242
Patented Jan. 19, 1965

3,166,242
OVEN TIMER
Frank A. Shomaker, 308 Green Gorge Road,
Signal Mountain, Tenn.
Filed Sept. 29, 1958, Ser. No. 764,047
9 Claims. (Cl. 235—61)

This invention relates to an oven timing mechanism, and in particular to a mechanism which will compute the total roasting time necessary for a particular item.

In determining the proper roasting or baking time an item of food such as meat should be cooked, there are two variables which are normally known. The first of these is the weight of the item in pounds and ounces and the second is the time per pound the meat should be cooked for proper roasting. For example, if one purchases a 7 pound, 4 ounce roast, and wishes to have it cooked to medium rare, by looking at a cooking chart it can be determined that the roast should be cooked at 325° for 19 minutes for each pound. This necessitates the cook multiplying 19 minutes by 7 pounds 4 ounces and then converting the product which will be in minutes to hours and minutes to set the standard automatic timer. It is the object of this invention to eliminate such computations by providing structure which will do it automatically.

It is a further object of this invention to improve the efficiency and convenient use of domestic and commercial ovens by providing a timer which takes much of the guesswork out of modern cooking. Greater accuracy is obtained because the tendency to estimate rather than compute cooking times will be decreased.

It is a further object of the invention to provide a sturdy arrangement of structure which can be used where it is necessary to combine two or more variables and have the output indicated by a definite mechanical movement.

It is a still further object of this invention to provide an arrangement of structure capable of multiplying a plurality of variables and have the resulting output of a physical movement capable of starting mechanisms such as a timing device.

The above expressly mentioned objectives are only indicative of the scope of the invention. Other valuable uses and objectives will become apparent upon a reading of the following specifications, in which:

FIG. 3 is a front view of the timer showing the scales;

FIG. 4 is a top sectional view with portions of the casing removed;

FIG. 5 is a side view with portions of the casing removed;

FIG. 6 is a section taken along the line 6—6 of FIG. 5;

FIG. 7 is a partial sectional view taken along the line 7—7 of FIG. 5; and

FIG. 8 is a partial sectional view taken along the line 8—8 of FIG. 5.

Figure 2:
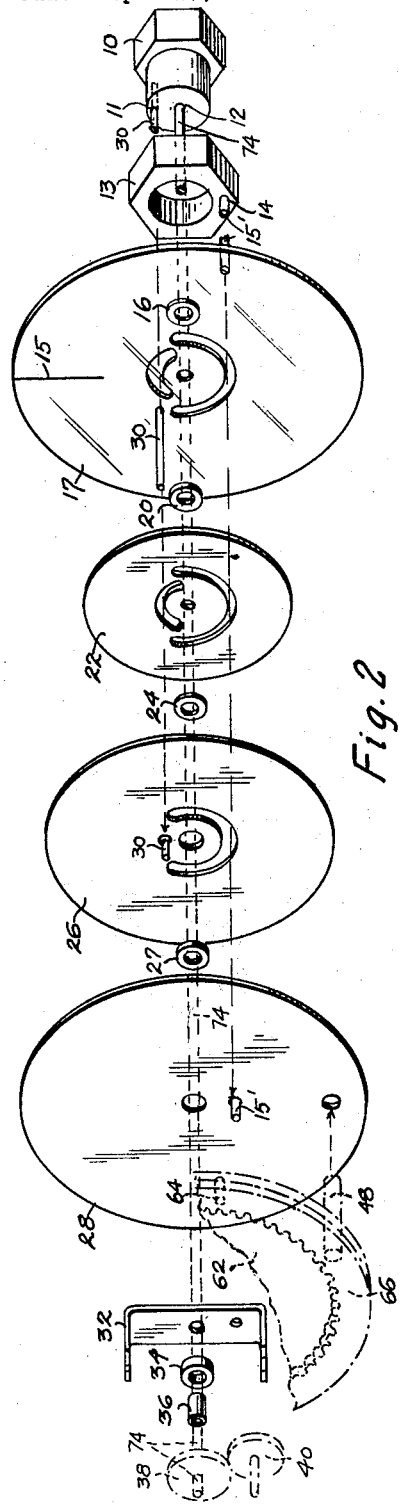
FIG. 2 is an exploded view of the remainder of the mechanism including the indicators and the manual controls.

Referring to FIG. 3, there is shown a transparent cover 17 having a hairline 15 etched on its surface. A knob 10, when turned in a clockwise direction, is capable of placing a certain cooking time in minutes per pound represented on dial 26 under the hairline 15. The knob 10 has an axially disposed recess 12 which receives the shaft 74, and another parallel axially offset recess 11 to receive the pin 30. A knob 13 when turned in a counterclockwise direction is capable of placing a certain value of weight logarithmically represented on dial 28 under the hairline 15. The calibrated dial 22, which shows total cooking time, will turn as a result of the above-mentioned inputs in a manner to be described below.

Figure 1:
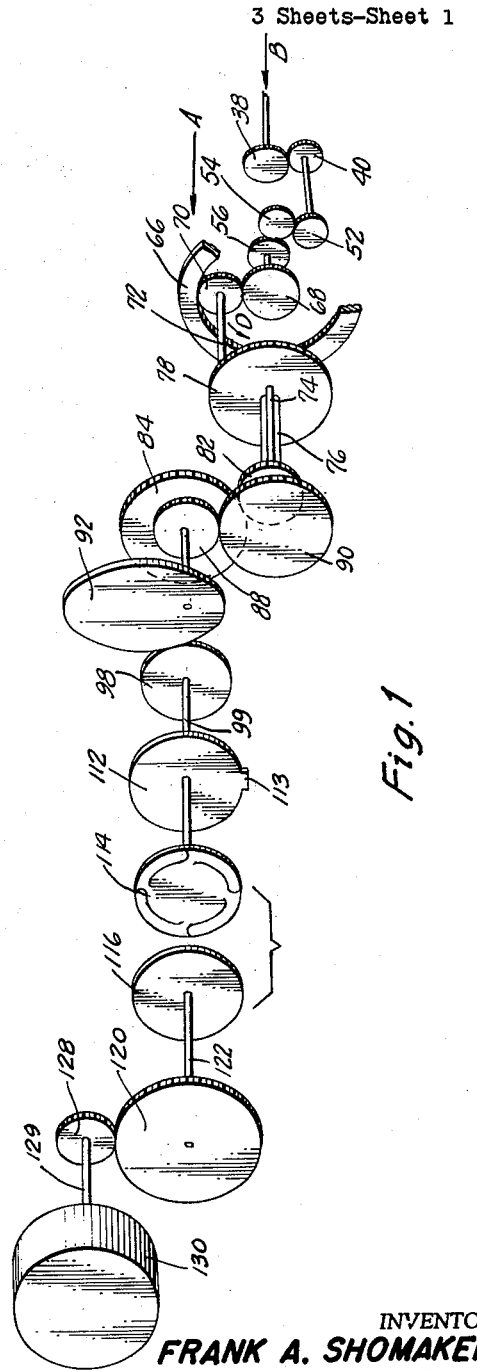
FIG. 1 is an exploded view of a portion of the mechanism including the gear mechanism.

Referring now to FIGS. 1 and 2, there is shown a schematic gear train which is instrumental in describing this invention. The input through knob 10 will for convenience be referred to as input A, and the input through knob 13 for convenience will be referred to as input B. Gear 52 is supported on a shaft 50. Input A moves gear 66 in a clockwise direction. This will cause the interior gear 70 to move a certain distance along an arc as shown by the arrow D. The input B through knob 13 is counterclockwise and will cause gear 38 to move counterclockwise, which will transmit a movement through gears 40, 52, 54, 56 and 68. The gear 68 will rotate clockwise which will give an additional distance movement to gear 70 along the arc path D. The sum of these two logarithmic inputs is now represented by a certain distance movement along the arc D.

The distance movement along the arc D is converted to a rotary movement by firmly attaching the center of gear 70 to the periphery of follower 78 through a connecting member 72. Rotation of the follower 78 causes gears 82 and 84 to rotate. Rotation of gear 84 causes the gear cam 92 to rotate. Cam 92 is an antilog cam which converts the rotational logarithmic input into a true rotational output through gear 98.

Gear 88 is rigidly fastened to the shaft between gears 84 and 92. Rotation of gear 88 causes a rotation of gear 90 which in turn is connected to calibrated dial 22 through the shaft 74 which is concentric to hollow shaft 76. Dial 22 is calibrated in a manner to place the total cooking time under the hairline 15.

The proportional rotational amount sent to dial 22 is also sent to the eccentric antilog cam 92. The peripheral contour of cam 92 is so designed that the rotational input given to its center by shaft 86 is converted to a true rotational output representing the sum of the logarithmic inputs when imparted to circular gear 98.

The rotation of gear 98 causes the rotation of cam 112. Cam 112 has a rise 113 adapted to engage and open a microswitch 134 which controls the heater and timer motor circuits. Cam 112 is fixedly secured to one-way slip clutch 114. The rotation of clutch 114 does not rotate bearing disc 116, although rotation of disc 116 will rotate slip clutch 114. When the timer is set, the rise 113 of cam 112 disengages with microswitch 134 causing the microswitch to close. After the timer has completed its cycle, the rise engages the microswitch and opens the heating circuit.

When rise 113 activates its adjacent microswitch, the clock motor 130 begins operation. A rotation is imparted through shaft 129 from the motor to gear 128, gear 120, shaft 122, and to bearing plate 116.

The rotation of plate 116 is imparted to slip clutch 114 which in turn drives the rest of the gear train in reverse until the pre-set time interval has elapsed. At this point, the rise 113 will de-activate the microswitch stopping the timing motor and de-energizing the controlled element. All dials will have returned to their original zero positions. A bearing 118 between 116 and 120 is provided to support a pin 122.

An exploded view of the mechanism is shown in FIGS. 1 and 2; FIGS. 5 and 6 show the mechanism assembled.

Knob 13 has a recess 14 therein adapted to receive pin 15' which rigidly connects knob 13 to dial 28. Dial 28 in turn is rigidly connected to plate 62 by pin 48. There is an arc-shaped slot in front wall 46 to permit the pin to perform this function. There are also matching arc-shaped slots in cover 17, dial 22, and dial 26 so that knob 13 may move dial 28. Spacing washers 16, 20, and 24 are provided between dials.

Plate 62 is rigidly connected to annular gear 66 by means of pins 64. Since all the connections are rigid, on a movement of knob 13, there will be a like movement of dial 28 and annular gear 66.

Knob 10 is connected directly to dial 26 and gear 38 by rod 30 riding in bearing 34 and sleeve 36. Knob 13 will be rotated counterclockwise to place a reading under the hairline and the movement will be carried through the gear train 38, 40, 52, 54, 56, 68 and finally imparting a clockwise angular movement to gear 70. A bearing 44 is provided for pin 42 which connects gears 40 and 52. A stub shaft 50 is adapted to be attached to spacing member 46 upon which gear 54 may rotate. Gear 70, then will reflect angular movements of knobs 10 and 13 by linear movement along the arc path D. A dome shaped spacer 32 provides a housing for gears 38 and 40.

This linear movement is converted to a rotation movement by connecting the center of gear 70 to the periphery of gear 78 by means of pin 72. As described briefly above, this rotation is imparted to gear 82 through shaft 76, and then to 84 and 88. Gear 88 in turn imparts it to gear 90. Gear 90 is rigidly mounted on the end of shaft 74. Shaft 74 passes freely through the centers of gear 82, plate 62, gear 78, sleeve 76, gear 68, gear 56, sleeve 58, through each of the dials 28 and 26, spacers 27 and 24 and is rigidly connected to dial 22. The sleeve 58 has a supporting flange 60 at one end thereof for easy attachment to plate 62. The shaft 74 then continues to knob 10 where it supports knobs 10 and 13 by recess 12. A dividing plate 80 adds rigidity to the framing members.

As described above, the rotation of gear 84 is transmitted to antilog cam 92. Due to the eccentricity of the cam it converts the logarithmic sum into a true rotational amount and imparts this amount to gear 98. As best seen in FIG. 7, gear 98 is biased into engagement with cam 92 through the pivoted lever 100 and the spring 96. Yoke arms 102 are provided at either end of the pivoted lever 100 so that lever 100 is pivoted at one end and supports gear 98 at the other end thereof. This arrangement permits the gear 98 to oscillate as well as rotate with respect to the contours of cam 92.

This oscillating and rotating function of gear 98 requires it to be connected to cam 112 in a special manner. This connection is made by the spring shaft 99. This shaft, in order to accurately transmit the rotational movement, is made of a close-knit spiral spring capable of some lateral deflection, but is torsionally rigid. Spring shaft 99 accurately transmits the rotational movement of gear 98 to cam gear 112. The main housing for the timing unit is comprised of top plate 110, back wall 126, and bottom wall 136. A sleeve 132 and a pin 124 are provided to support switching mechanism 134.

The cam 112 has a rise 113 thereon to trip the microswitch 134. The specific switch is of any convenient design having multiple contacts and of itself forms no part of this invention. It must merely be capable of starting and stopping the timer clock and the controlled item in response to contact by rise 113. The signal to activate these circuits is of any conventional means, but a preferred manner is to transmit the signal to the timer 130 through wires 135 and transmit the signal to the heater or any time-controlled item through wires 137.

Through the use of the above invention, it can be seen that an operator of a domestic or commercial oven need only set the temperature control at the proper setting and then set this timer control at the proper readings and everything then works automatically.

The invention described is inherently flexible in its operation. For instance, if one removed gear 54 from the gear chain and proportioned gears 52 and 56 to mesh, the system would be capable of dividing as well as multiplying.

In a general manner, while there has been disclosed in the above description, what is deemed to be a practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. In timer mechanisms, the combination including, control means for a device to be regulated, said control means having an element shiftable between a zero position and a plurality of other positions and having an inactive condition in the zero position and an active condition in said other positions, the amount of said shift being a function of time, integrating means having first and second input means and at least one output means, said first input means having a zero position and including scale means having progressive values in accordance with a first function of time and being manually movable in one direction away from the zero position to a predetermined setting to move said output means a first amount, said second input means having a zero position and including scale means having progressive values in accordance with a second function of time and being manually movable in one direction away from the zero position to a predetermined setting to move said output means a second amount, said first and second amounts of movement of the output means being the product of the scale values of the setting of the two input means, both said input means being movable in their respective reverse directions by reverse movement of said output means, means connecting said output means of the integrating means with said shiftable element of the control means to shift the element proportionally to the movement of the output means, and constant speed motor means connected with said output means, said motor means including means responsive to an active condition of said control means to move said output means in said reverse direction at said constant rate of speed and to stop said movement in said inactive condition.

2. In oven heating control mechanisms for an oven provided with heat-actuating means, the combination including, timing clock means having an element displaceable in one direction from a position at rest and including means to return said element to said rest position in an interval of time proportional to the amount of said displacement, actuating means being rendered effective by displacement of said element and deactivated when said element is at rest, first manually operable means to displace said element an amount proportional to a first functional value of time, logarithmic computer means including first manually settable means having a position at rest and being movable from said rest position to another predetermined position in proportion to a first functional value of time, said computer means also including second manually settable means having a position of rest and being movable from said rest position to another predetermined position in proportion to a second functional value of time, said computer means also including movable output means combining the movements of said first and second settable means in accordance with a prescribed ratio between said separate movements, and means connecting said output means with the displaceable element of the timing clock means.

3. The invention as defined in claim 2, wherein said output means includes visible indicia means movable with said output means and calibrated in accordance with the elapsed time represented by the amount of displacement of said element of the timing clock means.

4. In timing control devices for electric switch means, the combination including, timing motor means provided with shaft means having an initial position and rotatable in one direction an angular distance proportional to a desired interval of time, said timing motor means including means to rotate said shaft means in the opposite direction to return the shaft to the initial position in said interval of time, said electric switch means having actuator means selectable for a first and a second condition of operation, means connected between said shaft means and said actuator means to select said first condition of operation when said shaft means is in its initial position and said second condition of operation when said shaft means is rotated away from the initial position, first and second manually movable indicator means each having an initial position and being movable in one direction away from said initial position, epicyclic gear train means having at least three relatively movable elements, said first and second indicator means being connected respectively with two of said gear train elements, and means operatively connecting said third gear train element with said shaft means of the timing motor means.

5. The invention as defined in claim 4, wherein one of said three relatively movable elements of said gear train means comprises an antilogarithmic gear, and another of said three relatively movable elements comprises a gear meshing with said antilogarithmic gear and mounted on a movable pivot, whereby the ratio between the movement of said indicator means and said output means is non-linear.

6. The invention as defined in claim 4, wherein a third indicator means is included, and said gear train means includes a fourth element relatively movable with respect to said other elements, said fourth element being connected with said third indicator means.

7. In oven heat timing regulators, the combination including, a plurality of manually rotatable indicator means, planetary gear transmission means having a plurality of interconnected relatively movable elements, each of said indicator means being operatively connected with a respective movable element of the transmission means, timing means having rotating drive shaft means, movable scale means, and output means operatively connecting a respective movable element of the transmission means with the drive shaft means of said timing means and said movable scale means, said timing means including means for driving said shaft means at constant speed in one direction toward a fixed position at rest, and means for initiating and maintaining operation of said timing means when the shaft means is angularly displaced in the opposite direction from said position of rest.

8. The invention as defined in claim 7, wherein said indicator means and said movable scale means are concentrically mounted.

9. The invention as defined in claim 7, wherein said indicator means each includes circularly logarithmic scale means, and said output means includes a pair of shafts connected by mechanical antilog gearing means.

References Cited in the file of this patent

UNITED STATES PATENTS

| | | |
|---|---|---|
| 1,039,245 | Bishop | Sept. 24, 1912 |
| 1,889,876 | Pellerin et al. | Dec. 6, 1932 |
| 1,920,877 | 'Odatto | Aug. 1, 1933 |
| 2,069,184 | Hazard | Jan. 26, 1937 |
| 2,293,175 | Ruhl et al. | Aug. 18, 1942 |
| 2,358,309 | Batori | Sept. 19, 1944 |
| 2,492,229 | Le Blond et al. | Dec. 27, 1949 |
| 2,504,492 | Brown | Apr. 18, 1950 |
| 2,605,832 | Mueller | Aug. 5, 1952 |
| 2,733,764 | Bliss | Feb. 7, 1956 |
| 2,845,808 | Stover | Aug. 5, 1958 |
| 2,847,525 | Everard | Aug. 12, 1958 |

FOREIGN PATENTS

| | | |
|---|---|---|
| 720,986 | Germany | Apr. 23, 1942 |
| 865,318 | France | Feb. 17, 1941 |